United States Patent Office 3,126,917
Patented Mar. 31, 1964

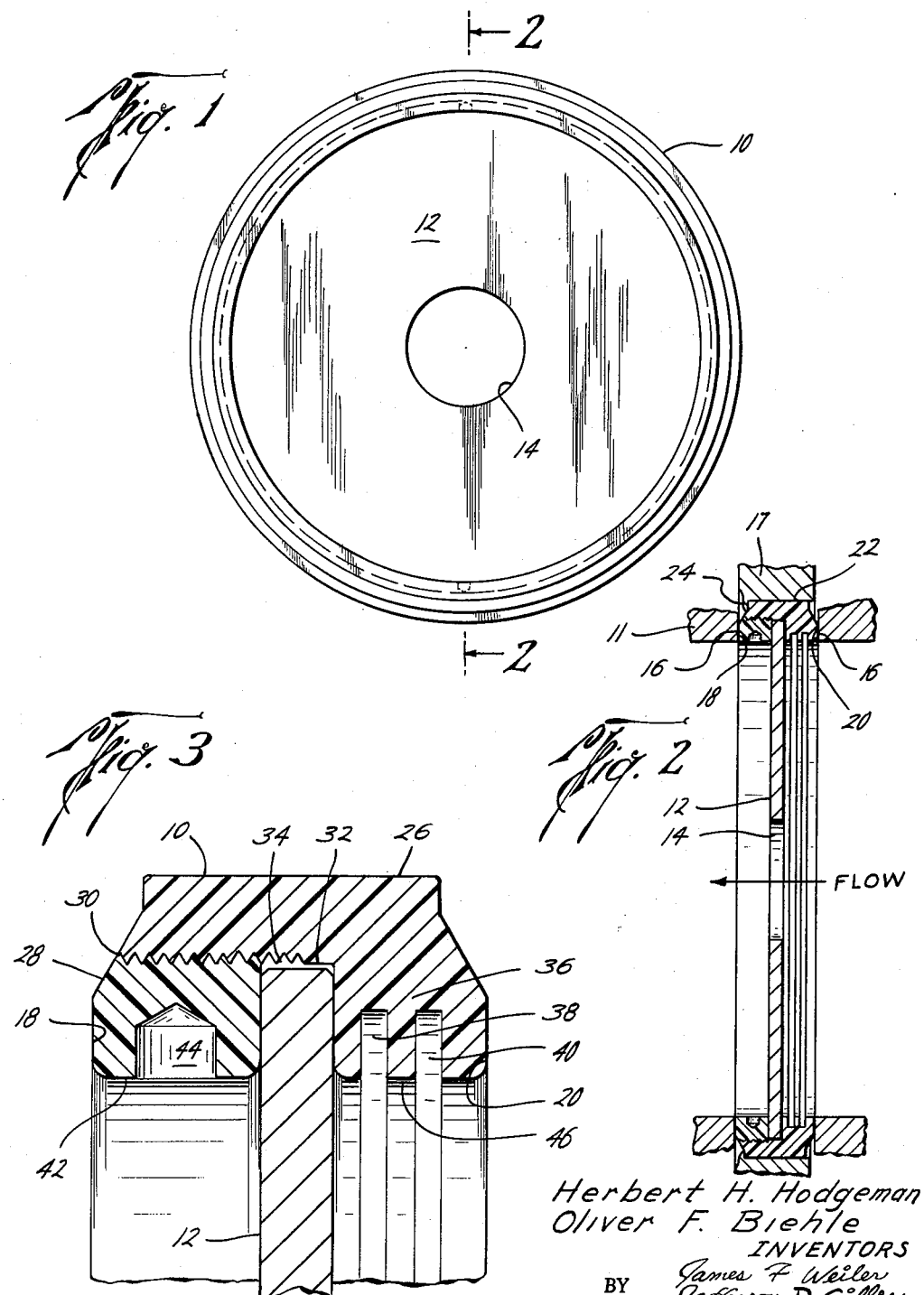

3,126,917
ORIFICE PLATE SEAL RING ASSEMBLY
Herbert H. Hodgeman and Oliver F. Biehle, Houston, Tex., assignors to Daniel Orifice Fitting Company, Houston, Tex., a corporation of California
Filed Feb. 5, 1963, Ser. No. 256,340
8 Claims. (Cl. 138—44)

The present invention relates to an improved orifice plate seal ring assembly, and more particularly to a seal ring assembly for use under severe environmental conditions.

The present invention constitutes an improvement over that shown in FIGURE 3 of the patent to Daniel, No. 2,407,951; FIGURE 6 of the patent to Whalen, No. 2,687,748; and in FIGURE 5 of the patent to Whalen, No. 2,860,901, to which patents reference is made for all purposes.

As is well known in the art, orifice plates are utilized as a conventional method for determining the rate of flow of a fluid, by determining the absolute pressure and the differential pressure on either side of an orifice plate placed in the path of such fluid flow. Orifice plates are precision instruments made with a variety of styles of open orifices, and generally the orifices in the orifice plates must be centered coaxially with the conduit through which the fluid is flowing. In this connection, the present invention is designed to be utilized with a plate carrier such as that shown as carrier 17 in Patent No. 2,860,-901, or carrier 17 in Patent No. 2,687,748, above identified.

It is, therefore, an object of the present invention to provide an orifice plate seal ring assembly which will effectively retain an orifice plate mounted therein within a plate carrier and in concentric relationship therewith.

In addition to holding an orifice plate in concentric relationship, a seal ring assembly is further designed to prevent leaking of the fluid within the conduit, around the edge of the orifice plate or orifice fitting seat in which the seal ring assembly is mounted, so as to insure against a false reading of the differential pressure, as well as to prevent erosion of the various surfaces.

Thus, it is a further object of the present invention to provide a seal ring assembly which effectively seals an orifice plate within the assembly, and effectively seals around the assembly within the orifice fitting.

With corrosive chemicals and gases the prior art seal rings have generally proven themselves to be somewhat deficient. For example, when the seal rings of the type shown in Patent No. 2,407,951 are made of rubber, or a synthetic substitute such as Buna-N elastomer, it has been found that certain environmental gases impregnate the rubber and cause a failure of the sealing ring. Likewise, rubber gaskets, such as that shown in Patent No. 2,687,-748, suffer the same defect. In addition, rubber is not suited for use with high temperature fluids.

To overcome these deficiencies, a relatively inert seal ring assembly is required. Obviously, with certain fluids, such a seal ring may be made of metal. However, an even greater number of fluids may be accommodated in a wide temperature range through the use of a seal ring assembly made of one of the fluorocarbons, such as Teflon, a polymerized tetrafluorethylene resin, or Kel-F, a polymerized trifluorchlorethylene resin. In addition to these fluorocarbon materials being highly inert with respect to the commonly encountered corrosive fluids, the majority are capable of use in temperature ranges far exceeding those of the rubber products of the prior art.

Consequently, it is another object of the present invention to provide an orifice plate seal ring assembly which is capable of use in relatively high fluid temperature ranges, as well as capable of use with the commonly encountered corrosive fluids.

Yet another object of the present invention is to provide an orifice plate seal ring assembly which is made of a fluorocarbon material.

Most fluorocarbon materials, and in particular Kel-F and Teflon, have the undesirable property of cold-flowing, particularly after a constant force is applied to these materials over an extended period of time. On the other hand, when the force applied is relatively low, this cold-flowing property is negligible, and the fluorocarbons may be considered to be relatively elastic. Therefore, the present invention utilizes a particular combination of elements in its cross-section which will enhance the flexibility so as to assure proper sealing, and at the same time to overcome tendencies to cold-flow.

Thus, it is another object of the present invention to provide a fluorocarbon seal ring assembly with inherent characteristics of flexibility to provide adequate sealing and with inherent characteristics of rigidity to overcome an adverse tendency to cold-flow.

When orifice plates are utilized in metering corrosive fluid, or when the flow rates are changed from a range for which a particular orifice is designed, it is necessary that the orifice plate be removed from the conduit and replaced with a different orifice plate. In this connection, it is highly desirable that a minimum amount of parts be required. Therefore, provision is made in the present invention for interchanging orifice plates in a most expeditious manner while maintaining the same seal ring assembly. As was previously mentioned, fluorocarbon materials are somewhat flexible. Therefore, the present invention utilizes concentric or telescoping annular bodies with appropriate fine threads to join the bodies, which bodies may be readily snapped together with an orifice plate appropriately placed therein, thus making it possible to interchange orifice plates readily.

Thus, it is a further object of the present invention to provide an orifice plate seal ring assembly which utilizes the flexible properties of a fluorocarbon material to provide snap threads for efficient assembly.

Yet another object of the present invention is to provide a seal ring assembly of fluorocarbon material whereby friction, scoring, and binding of the sealing ring in dry surfaces is reduced due to the slick properties of the material.

Other and further objects, features and advantages will be apparent from the following description of a presently preferred embodiment of the invention, given for the purpose of disclosure, and taken in conjunction with the accompanying drawings, where like character references designate like parts throughout the several views, and where:

FIGURE 1 is an end view of the seal ring assembly showing an orifice plate mounted therein, FIGURE 2 is a sectional view taken along the line 2—2 of FIGURE 1, including the addition of part of an orifice fitting and plate carrier therein, and FIGURE 3 is an enlarged detailed cross-sectional view of a portion of the seal ring assembly of FIGURE 2.

Generally, the present invention comprises seal ring assembly which may be of a fluorocarbon material and includes two readily engaged annular members with provision for retaining an orifice plate therebetween, one of said members including at least two grooves for providing flexibility and sealing, and the other member having sufficient mass to prevent cold-flowing, and the combination with an orifice fitting within which the seal ring assembly is placed.

Referring now to the drawings, and particularly to FIGURE 1, the reference numeral 10 generally designates the seal ring assembly which encloses the orifice plate 12. The orifice plate 12 is shown as including a circular orifice 14 therein, however, it is understood that any of a number of other conventional orifices may be utilized, such as semicircular, quarter-round, beveled, and bore with counter bore.

Referring now to FIGURE 2, a cross-sectional view of the seal ring assembly 10 and orifice plate 12 is seen. Shown partially in section adjacent to the seal ring assembly 10 is the orifice fitting body 11, between which an orifice plate is inserted. Also shown partially in section is the plate carrier 17 which is a device for inserting and removing the combined seal ring assembly 10 and orifice plate 12. A fuller explanation of the conventional orifice plate fitting 11 and plate carrier 17 may be had by referring to the patent to Whalen, No. 2,860,901, above referred to.

It will be noted that the orifice fitting 11 includes parallel surfaces 16 which are perpendicular to the axis of the conduit through which the fluid flows. These parallel surfaces 16 are spaced apart a predetermined distance and the sides 18 and 20 of the orifice plate assembly 10 fit tightly therebetween, in a manner to be hereinafter described.

The plate carrier 17 includes an axial bore 22 into which the orifice plate seal ring assembly 10 is placed, and further includes a lip 24 to prevent the said seal ring assembly 10 from passing completely therethrough, all in accordance with the previously described prior art patents.

Referring now to FIGURE 3, which is an enlarged partial sectional view of the seal ring assembly 10 shown in FIGURES 1 and 2, it will be noted that the seal ring assembly 10 comprises an annular band 26 into which is telescopically threaded an annular retaining ring 28. Further, it will be noted that the coacting threads 30 joining the band 26 and ring 28 extend along the counter bore 32 within the band 26 to approximately the midpoint of the axial length of the seal ring assembly 10 when assembled. As shown in FIGURE 3, the orifice plate 12 is placed concentrically within the counter bore 32 and the recess 34 formed by the band 26 and ring 28.

Thus, it is seen that the annular band 26 may be described as having a shoulder portion 36 which extends radially inwardly from the counter bore 32 in the said band 26. Extending radially outwardly from the inner surface 46 of the band 26 and into the shoulder 36 are compression grooves 38 and 40, one of which is adjacent the recess 34 and the other of which is adjacent the side 20 of the band 26.

Disassembly means are provided for releasably securing the ring 28 within the band 26. For example, extending radially outwardly into the inner wall 42 of the ring 28 is a socket 44. As may be noted by referring to FIGURES 1 and 2, the socket 44 is but one of a pair, or more, of such sockets, whose function is to implement a conventional spanner wrench in releasably securing the ring 28 within the band 26 to form the seal ring assembly 10. Obviously, other shapes, sizes, and placements of similar means may be utilized to aid in threadably assembling or disassembling the seal ring assembly 10.

At this point, it is well to note that the inner surface or wall 46 of the band 26 has the same radial diameter as the inner surface or wall 42 of the ring 28, both of which typically have the same internal diameter as that of the fitting body 11 or other conduit in which the seal ring assembly 10 is placed.

Referring again particularly to FIGURE 3 it will be noted that the threads 30 are of a relatively fine pitch when compared to the overall diameter of the seal ring assembly 10. The purpose of utilizing such fine pitch threads 30 is to obtain a ready means for the efficient assembly of the band 26 and ring 28 with the orifice plate 12 therebetween. Thus, when the seal ring assembly 10 is constructed of a slightly flexible fluorocarbon material, such as Teflon, then instead of threadably assembling the band 26 and the ring 38, these parts may be simply snapped together by overriding the threads 30. Thus, by placing the orifice plate 12 within the counter bore 32 of the band 26 and by placing the ring 28 adjacent the counter bore 32, and simply applying force to press the ring 28 into the band 26, the flexibility of the fluorocarbon material allows the seal ring assembly 10 to be readily secured. Thereupon, if any further tightening or sealing of the plate 12 within the recess 34 is necessary, this may be readily accomplished by rotating the ring 28 relative to the band 26.

When the band 26, ring 28, and plate 12 are securely assembled, the groove 38 allows the shoulder 36 to compress slightly, whereby an effective seal is secured between the seal ring assembly 10 and the orifice plate 12. In this manner, fluids passing through the conduit are prevented from leaking around the outer edge of the plate 12.

In a similar manner, the groove 40 in the shoulder 36 of the band 26 allows a degree of axial flexibility or compression in the seal ring assembly 10 whereby the seal ring assembly 10 with the orifice plate 12 therein, may be forced between the surfaces 16 of the fitting body 11. Thus, an effective seal is provided between the surfaces 20 and 16 and 18 and 16 of the seal ring assembly 10 and fitting body 11. In this manner, leakage is prevented from occurring about the seal ring assembly 10.

As a matter of design, it is imperative that the total axial width of the assembled seal ring assembly 10 with the orifice plate 12 therein, be such that the distance between the surfaces 16 of the fitting 11 provide a tight fit for the seal ring assembly 10, yet not cause the fluorocarbon material to cold-flow. To combat this tendency of fluorocarbon materials to cold-flow, grooves similar to 38 and 40 are not placed in the ring 28 but instead a more rigid and solid body is provided. Further, in use, the seal ring assembly must include the grooves 38 and 40 on the upstream side of the direction of fluid flow (indicated by the arrow), and the more solid ring 28 on the downstream side, as is seen in FIGURE 2.

Thus, it is seen that the present invention utilizes fluorocarbon material to provide flexibility for sealing by means of the grooves 38 and 40 as well as flexibility for snap threading the assembly together by means of the threads 30, and yet at the same time provide sufficient material to prevent cold-flowing of the said fluorocarbon material when force is applied to the seal ring assembly 10 by means of fluid flow against the upstream side of the plate 12.

Yet another advantage of the use of fluorocarbon materials in the construction of the seal ring assembly 10 is also realized, in that fluorocarbon materials generally include a slick characteristic, or degree of lubrictiy, which will ease problems of friction, scoring, and binding between the surfaces 16 during insertion and removal of the assembly 10 in metering services where the fluid which is flowing is relatively dry.

It is, of course, now apparent that the seal ring assembly 10 may be constructed of a material other than fluorocarbon, such as metal, however, in these instances, it will be difficult to obtain the flexibility required for snap thread action, even though sufficient flexibility may remain for utilizing the grooves 38 and 40 to secure adequate sealing. Hence, the present invention is directed particularly to the used of the fluorocarbon material as the preferred material for the seal ring assembly 10 while the use of less desirable materials for the practice of this invention is not negatived.

In use, an orifice plate 12 is placed within the counter bore 32 of the band 26, and the ring 28 is snapped within the said recess 32 by overriding the threads 30, due to the flexibility of the material from which the seal ring assembly 10 is made. Thereupon, if any further tightening is necessary, the ring 28 is rotated relative to the band 26 thereby slightly compressing the shoulder 36 in the vicinity of the groove 38 and providing a tight seal about the periphery of the plate 12. Then, the assembled seal ring assembly 10, including the plate 12 therein, is inserted between the surfaces 16 of the fitting body 11, typically by means of the plate carrier 17, until the seal ring assembly 10 is coaxially concentric with the conduit through which the fluid is or will be flowing. The direction of fluid flow is shown diagrammatically in FIGURE 2, and it is important, as previously described, to prevent cold flowing of the seal ring assembly 10 when made of a fluorocarbon material, that the recesses 38 and 40 be placed in the upstream side of the direction of fluid flow.

When it is desired to remove the orifice plate 12, either for reasons of inspection, erosion, or replacement with a more appropriate size on change of rate of fluid flow, the plate carrier 17 is withdrawn, thereby withdrawing the seal ring assembly 10, including the orifice plate 12 therein. Thereupon, the seal ring assembly 10 is disassembled simply by rotating the ring 28 relative to the band 26, and in this connection the disassembly means, shown as the spanner wrench sockets 44, may provide a most effective means for aiding in rotating the ring 28 relative to the band 26. Upon removal of the ring 28 from the band 26, the orifice plate 12 may be simply withdrawn from the counter bore 32 within the band 26.

The present invention, therefore, is well adapted to carry out the objects and attain the ends and advantages mentioned as well as others inherent therein. While a presently preferred embodiment of the invention has been given for the purpose of disclosure, numerous changes in the details of construction, and the combination, shape, size, arrangement of parts, and uses may be resorted to without departing from the spirit and scope of the invention as hereinafter claimed.

What is claimed is:
1. In a sealing ring for orifice plate assemblies
(A) An annular band formed of a yieldable and flexible material,
 (a) said band having an annular recess in the inner wall extending from a first side of said band to a point past the center of the axial length of said band, thereby forming a shoulder,
 (b) said shoulder having at least two grooves therein,
 (c) one of said grooves adjacent said shoulder,
 (d) the other of said grooves adjacent a second side of said band,
 (e) said recess including threads extending from said first side to substantially the center of the axial length of said band, and
(B) An annular ring formed of a yieldable and flexible material,
 (a) said ring having external threads engageable with said recess threads.
2. In a sealing ring for orifice plate assemblies
(A) An annular band formed of a yieldable and flexible material,
 (a) said band having an annular recess in the inner wall extending from a first side of said band to a point past the center of the axial length of said band, thereby forming a shoulder,
 (b) said shoulder having at least two grooves therein,
 (c) one of said grooves adjacent said shoulder,
 (d) the other of said grooves adjacent a second side of said band,
 (e) said recess including threads extending from said first side to substantially the center of the axial length of said band, and
(B) An annular ring formed of a yieldable and flexible material,
 (a) said ring having external threads engageable with said recess threads,
 (b) said ring including disassambly means whereby said ring and band may be readily disengaged by rotation of said band relative to said ring.
3. In a sealing ring for orifice plate assemblies
(A) An annular band formed of a yieldable and flexible material,
 (a) said band having an annular recess in the inner wall extending from a first side of said band to a point past the center of the axial length of said band, thereby forming a shoulder,
 (b) said shoulder having at least two grooves therein,
 (c) one of said grooves adjacent said shoulder,
 (d) the other of said grooves adjacent a second side of said band,
 (e) said recess including threads extending from said first side to substantially the center of the axial length of said band, and
(B) An annular ring formed of a yieldable and flexible material,
 (a) said ring having external threads engageable with said recess threads,
 (b) said ring including at least two sockets extending radially outwardly from the inner wall of said band whereby said ring and band may be readily disengaged by rotation of said band relative to said ring.
4. An orifice plate sealing assembly for use in an orifice fitting comprising
 (a) an annular member including a threadably engageable band and ring,
 (b) said band and ring defining an annular recess extending radially outwardly from the inner wall of said band and ring when threadably engaged,
 (c) said band including at least two annular grooves extending radially outwardly from the inner wall,
 (d) one of said grooves being adjacent said recess and the other being adjacent the side of said band which is farthest from said second ring,
 (e) the width of said recess being axially adjustable to snugly engage an orifice plate, and
 (f) the inner wall of said band and ring having the same radial diameter.
5. A sealing assembly for an orifice plate comprising
 (a) an annular band,
 (b) an annular ring threadably telescopable within said band,
 (c) said band including a shoulder extending radially inwardly,
 (d) said ring and band when telescoped defining a recess adjacent said shoulder wherein an orifice plate may be snugly engaged,
 (e) said shoulder including at least two grooves extending radially outwardly,
 (f) one of said grooves being adjacent said recess and
 (g) the outer of said grooves being adjacent a side of said band
6. A sealing assembly for an orifice plate comprising
 (a) an annular band,
 (b) an annular ring threadably telescopable within said band,
 (c) said band including a shoulder extending radically inwardly,
 (d) said ring and band when telescoped defining a recess adjacent said shoulder wherein an orifice plate may be snugly engaged,
 (e) said shoulder including at least two grooves extending radially outwardly,
 (f) one of said grooves being adjacent said recess and
 (g) the other of said grooves being adjacent a side of said band,
 (h) and means for gripping said ring to aid in threadably disassembling said sealing assembly.
7. A sealing assembly for an orifice plate comprising
 (a) an annular band,

(b) an annular ring threadably telescopable within said band,
(c) said band including a shoulder extending radically inwardly,
(d) said ring and band when telescoped defining a recess adjacent said shoulder wherein an orifice plate may be snugly engaged,
(e) said shoulder including at least two grooves extending radially outwardly,
(f) one of said grooves being adjacent said recess and
(g) the other of said grooves being adjacent a side of said band,
(h) and means for gripping said ring to aid in threadably disassembling said sealing assembly,
(i) both said ring and band consisting of a fluorocarbon material.

8. The combination with an orifice fitting having parallel spaced apart surfaces forming a cavity perpendicular to the direction of fluid flow, of an orifice plate sealing assembly including
(a) an annular band,
(b) an annular ring threadably telescopable within said band,
(c) said band including a shoulder portion extending radially inwardly,
(d) said ring and the shoulder portion of said band defining a recess wherein an orifice plate may be snugly engaged,
(e) the inner walls of said ring and shoulder portion of said band having the same radial diameter,
(f) said shoulder portion including at least two grooves extending radially outwardly,
(g) one of said grooves being adjacent said recess and
(h) the other of said grooves being adjacent a side of said band,
(i) said ring and band consisting of a fluorocarbon material, and
(j) the axial length of said sealing assembly with an orifice plate snugly engaged in said recess being slightly larger than the spaced apart surfaces of said fitting.

No references cited.